United States Patent Office 3,530,094
Patented Sept. 22, 1970

3,530,094
POLYCARBONATES
Hermann Schnell, Krefeld-Uerdingen, and Ludwig Bottenbruch, Hans-Helmut Schwarz, and Hans-Georg Lotter, Krefeld-Bockum, Germany, assignors to Farbenfabriken Bayer Aktiengesellschaft, Leverkusen, Germany, a corporation of Germany
No Drawing. Continuation-in-part of application Ser. No. 598,149, Dec. 1, 1966. This application Dec. 23, 1968, Ser. No. 786,452
Claims priority, application Germany, June 10, 1960, F 31,406
Int. Cl. C08g 17/13
U.S. Cl. 260—47
11 Claims

ABSTRACT OF THE DISCLOSURE

A continuous process for preparing high molecular weight substantially linear polycarbonates having improved properties which comprises
(1) continuously introducing a stream of (a) an aqueous alkaline solution of an aromatic dihydroxy compound and of a monohydric phenol as chain breaker containing from about 1.7 to about 2.3 mols of alkali hydroxide per mole of dihydroxy compound, and simultaneously (b) an inert organic solvent capable of dissolving the resulting polycarbonate, (c) at least an equivalent amount of phosgene or the bis-chlorocarbonic acid ester of an organic dihydroxy compound and, if the phenolate solution contains less than about 2.2 mols of alkali hydroxide per mol of dihydroxy compound (d) a concentrated aqueous alkali hydroxide solution in such a ratio to maintain the pH value of the aqueous phase between about 12.0 and about 13.5,
(2) progressively flowing the reaction mixture while introducing (e) a catalyst and simultaneously (f) a further stream of a concentrated aqueous alkali hydroxide solution in such a ratio to maintain the pH value of the aqueous phase between about 12.0 and about 13.5 and
(3) separating the organic phase from the aqueous phase and isolating the polycarbonate from the organic phase.

---

This is a continuation-in-part application of the co-pending application, Ser. No. 598,149, filed Dec. 1, 1966, which, in turn, is a continuation-in-part application of the co-pending application, Ser. No. 115,934, filed June 9, 1961, both now abandoned.

In the U.S. patent specification No. 3,133,044 there is described a continuous process for preparing high molecular weight, substantially linear polycarbonates which comprises
(1) Continuously introducing a stream of (a) an aqueous alkaline solution of an aromatic dihydroxy compound and an monohydric phenol as chain breaker containing from about 2.2 to about 3.13 mols of alkali hydroxide per mol of dihydroxy compound, (b) an inert organic solvent capable of dissolving the resulting polycarbonate and (c) at least an equivalent amount of phosgene,
(2) Progressively flowing the reaction mixture while introducing (d) a catalyst, and
(3) Separating the organic phase from the aqueous phase and isolating the polycarbonate from the organic phase.

The starting bisphenolate solution of this process containing the bisphenol and the alkali hydroxide in a molar ratio from 1:2.2 to 1:3.13 has a pH value between about 13.1 and about 14.0. As in the course of this process no further alkali hydroxide is added to the reaction mixture, the pH value of the aqueous phase drops remarkably after the beginning of the introduction of the phenol. However, if the pH value of the starting solution is relatively high it reaches the preferred range between 13.5 to 12.0 only slowly and, therefore, a remarkable portion of the phosgene saponifies rather than reacts with the phenols, thus, corresponding portions of the bisphenol do not react.

On the other hand, if the pH value of the starting solution is relatively low it drops in the course of the process below the preferred range of 13.5 to 12.0, thus, also remarkable portions of the bisphenol do not react.

In both cases, the polycarbonate obtained has a molecular weight lower than that calculated on the amount of the monohydric phenol as chain breaker in the reaction mixture and contains very high amounts of saponifiable chlorine which indicates that the polycarbonate contains many chloroformate end groups. Both features wrong the quality of the polycarbonate.

It is, therefore, an object of this invention to provide an improved method for preparing polycarbonate plastics. Another object of the invention is to provide a method for preparing polycarbonate plastics having improved properties. Still another object of the invention is to provide a method for preparing a high molecular weight polycarbonate which can be processed by thermoplastic methods with reduced tendency towards discoloration. A still further object of the invention is to provide an improved polycarbonate plastic.

A further object of the invention is to provide a polycarbonate plastic which is chain terminated by unreactive end groups. Still a further object of the invention is to provide a polycarbonate plastic which is thermally stable. A still further object of this invention is to provide a method for preparing a polycarbonate plastic substantially free of monomeric and low molecular weight polycarbonates.

The foregoing objects and others are accomplished with this invention by providing a process for making polycarbonates which comprises
(1) Continuously introducing a stream of (a) an aqueous alkaline solution of an aromatic dihydroxy compound and of a monohydric phenol as chain breaker containing from about 1.7 to about 2.3 mols of alkali hydroxide per mol of dihydroxy compound, and simultaneously (b) an inert organic solvent capable of dissolving the resuling polycarbonate, (c) at least an equivalent amount of phosgene or the bis-chlorocarbonic acid ester of an organic dihydroxy compound and, if the phenolate solution contains less than about 2.2 mols of alkali hydroxide per mol of dihydroxy compound, (d) a concentrated aqueous alkali hydroxide solution in such a ratio to maintain the pH valve of the aqueous phase between about 12.0 and about 13.5.
(2) Progressively flowing the reaction mixture while introducing (e) a catalyst and simultaneously (f) a further stream of a concentrated aqueous alkali hydroxide solution in such a ratio to maintain the pH value of the aqueous phase between about 12.0 and about 13.5 and
(3) Separating the organic phase from the aqueous phase and isolating the polycarbonate from the organic phase.

The difference between the two processes is shown by the following table. Three polycarbonates were prepared in a reactor cascade having five stirring vessels. The reaction mixtures flowed continuously from one reactor to the next reactor of the cascade. In the first reactor there are added continuously at 25° C. a stream of a solution of bisphenol A and p-tert.-butyl phenol in a concentrated aqueous sodium hydroxide solution, a stream of methylene chloride and a stream of phosgene in the ratios indicated in the table. The experiments 1 and 2 correspond to the teaching of the U.S. patent specification mentioned above, experiment 1 especially to Example 1, while Example 3 corresponds to the instant invention.

After an average stay of the reaction mixture in the first cascade of about 5 minutes the mixture flowed continuously to the second reactor. To this second reactor there was added triethyl amine as catalyst in a ratio as indicated in the table and in experiment 3 a further quantity of concentrated sodium hydroxide solution. After an average residence time in this second cascade of about 4 to 5 minutes, the reaction mixture passed continuously the third, forth and fifth cascade, the average stays in these reactors being about 5, 10 and 25 minutes.

line, pyridine, piccoline, quinoline or their salts and the like.

Any suitable aromatic dihydroxy compounds, such as, for example, those disclosed in the Canadian Pats. 578,-575, 578,795 and 594,805 and U.S. patent applications Ser. Nos. 557,256, now abandoned, 572,802, now U.S. Pat. No. 3,136,741, 461,938, now U.S. Pat. No. 3,028,365, 572,793, now U.S. Pat. No. 3,271,367, and 8,931, now abandoned can be used in this invention. Specific examples of such compounds include hydroquinone,
resorcinol,
pyrocatechol,
4,4'-dihydroxy-diphenyl,
2,2'-dihydroxydiphenyl,

TABLE

|  | 1 | 2 | 3 |
|---|---|---|---|
| (1) Starting solutions: |  |  |  |
| Mols of NaOH/mols of bisphenol A | 3.13 | 2.20 | 2.00 |
| pH value | 14.0 | 13.3 | 13.1 |
| (2) Additions to reactor 1: |  |  |  |
| (a) {Bisphenol A (mols/h.) (as 20% phenolate sols.) | 50 | 60 | 60 |
| p-tert.-butylphenol (mol percent rel. to bisphenol A) | 2.43 | 3.08 | 3.08 |
| NaOH (as phenolates) (mols/h.) | 156.5 | 132 | 120 |
| (b) Methylene chloride/chlorobenzene (7:3) (kg./h.) | 112.5 | 135 | 135 |
| (c) Phosgene (mols/h.) | 50 | 60 | 60 |
| (3) pH values at the end of reactor 1 | 13.7 | 12.5 | 12.2 |
| (4) Additions to reactor 2: |  |  |  |
| (d) Triethyl amine (mols/h.) | 0.25 | 0.36 | 0.30 |
| (e) NaOH (as 45% solutions): |  |  |  |
| (mols/h.) |  |  | 12 |
| (mols/mol bisphenol) |  |  | 0.20 |
| (5) Total mols of NaOH/mol of bisphenol A | 3.13 | 2.20 | 2.20 |
| (6) pH values at the end of reactor 2 | 13.6 | 7.5 | 12.3 |
| (7) pH values at the end of reactor 5 | 13.6 | 7.5 | 12.2 |
| (8) 3ı rel. of the polycarbonate (0.5 g. in 100 ml. methylene chloride at 25° (C.) | 1.190 | 1.167 | 1.260 |
| (9) Saponifiable chlorine content of the polycarbonate (p.p.m.) | 420 | 1,450 | 19 |

In a preferred embodiment of the invention, a series of reaction vessels, each provided with an agitator, are joined together and the flowing liquids are passed through the vessels, with agitation. However, instead of a series of separate vessels, a continuous tubular reactor, preferably an unpacked tubular reactor, may be used.

In accordance with this process the amount of solvent for the polycarbonate used must be sufficient to completely dissolve the polycarbonate and to form a true solution. It is preferred that the amount of solvent be such that at the end of the reaction, the resulting polycarbonate solutiton has a viscosity of not more than about 600 centipoises. As the viscosity of the polycarbonate solution depends not only on its content of polycarbonate but also on the average molecular weight of the polycarbonate, which may vary from about 10,000 to about 200,000 and more, the ratio of dissolved polycarbonate to solvent may vary within wide limits. As a rule the solution of polycarbonate preferably contains from about 3 percent to about 25 percent by weight polycarbonate with the balance being inert organic solvent therefor. Most preferably the solution will contain from about 8 percent to about 15 percent by weight polycarbonate.

The reaction between the phosgene or the bis-chlorocarbonic acid and the aromatic dihydroxy compound can be carried out at any suitable temperature between the solidification point of the aqueous solution and the boiling point of the organic solvent or water whichever is lower. In other words, the reaction can be effected at any temperature from about 0° C. to about 100° C. and preferably between about 20° C. and 60° C.

Any suitable catalyst, such as, for example, any suitable tertiary amine or quaternary ammonium compound including those disclosed in U.S. applications, Ser. Nos. 461,938, now U.S. Pat. No. 3,028,365 and 572,793, now U.S. Pat. No. 3,271,367 can be used. Examples of suitable catalysts are trimethylamine, triethylamine, tripropylamine, N,N-dimethyl-cyclohexylamine, N,N-diethyl-cyclohexylamine, N,N-dimethylaniline, N,N-diethylani- 1,4-dihydroxy-naphthalene,
1,6-dihydroxy-naphthalene,
2,6-dihydroxy-naphthalene,
1,2-dihydroxy-naphthalene,
1,5-dihydroxy-naphthalene,
1,4-dihydroxy-quinolene,
2,2'-dihydroxy-1,1'-dinaphthalene,
o-, m-, and p-hydroxy-benzyl alcohol,
(4,4'-dihydroxy-diphenyl)-methane,
2,2-(4,4'-dihydroxy-diphenyl)-propane,
1,1-(4,4'-dihydroxy-diphenyl)-cyclohexane,
1,1-(4,4'-dihydroxy-3,3'-dimethyl-diphenyl)-cyclohexane,
2,2-(2,2'-dihydroxy-4,4'-ditertiary-butyl-diphenyl)-propane,
3,3-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl-butane,
2,2-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4'-(4,4'-dihydroxy-diphenyl)-heptane,
2,2-(4,4'-dihydroxy-diphenyl)-tridecane,
4,4'-dihydroxy-diphenyl-sulphone,
2,2'-dihydroxy-diphenyl-sulphone,
3,3'-dihydroxy-diphenyl-sulphone,
4,4'-dihydroxy-2,2'-dimethyl-diphenyl-sulphone,
4,4'-dihydroxy-3,3'-dimethyl-diphenyl-sulphone,
2.2'-dihydroxy-4,4'-dimethyl-diphenyl-sulphone,
2,2'-dihydroxy-1,1'-dinaphthalene-sulphone,
4,4'-dihydroxy-diphenyl ether,
4,4'-dihydroxy-2,2'-dimethyl-diphenyl ether,
4,4'-dihydroxy-3,3'-dimethyl-diphenyl ether,
4,4'-dihydroxy-diphenyl sulphide,
4,4'-dihydroxy-3,3'-dimethyl-diphenyl sulphide,
4,4'-dihydroxy-diphenyl sulphoxide,
4,4'-dihydroxy-2,2'-dimethyl-diphenyl sulphoxide,
4,4'-dihydroxy-3,3'-dimethyl-diphenyl sulphoxide.

A di-(monohydroxy-arylene)-alkane is preferred as the dihydroxy compound. Of these preferred compounds, the most preferred is 2,2-(4,4'-dihydroxy-diphenyl)-propane.

As bis-chlorocarbonic acid esters there may be used those of aromatic dihydroxy compounds as mentioned above as well as of aliphatic and cycloaliphatic dihydroxy compounds such as, for instance, ethylene glycol, diethylene glycol, triethylene glycol, polyethylene glycol, thiodiglycol, ethylene dithiodiglycol, propane-1,2-diol and the di- or polyglycols produced from propylene-1,2-oxide, propane-1,3-diol, pentane-1,3-diol, butane-1,4-diol, 2-methyl-propane-1,3-diol, pentane-1,5-diol, 2-ethyl- propane-1,3-diol, hexane-1,6-diol, octane-1,8-diol, 2-ethyl-hexane-1,3-diol, decane-1,10-diol, quinite, cyclohexane-1,4-diol, m- and p-xylylene-glycol, 2,2-(4,4'-dihydroxy-dicyclohexyl)-propane and 2,6-dihydroxy-decahydronaphthalene and the like.

While the ratio of phosgene to aromatic dihydroxy compound is not critical, it is preferred that at least 1 mol of phosgene be added per mol of aromatic dihydroxy compound, preferably from about 1.0 to about 1.4 mols of phosgene per mol of aromatic dihydroxy compound, and more preferably, from about 1.0 to about 1.3 mols of phosgene per mol of aromatic dihydroxy compound.

The phosgene may be introduced into the reaction mixture as gas or it can be dissolved in an inert solvent and introduced as a phosgene solution.

Any suitable inert organic solvent for the polycarbonate can be used. Examples of such solvents are disclosed in the above-mentioned patents and patent applications. Included in the group of suitable solvents are methylene chloride, ethylene chloride, chloroform, chlorobenzene, benzene, toluene, and the like.

As indicated above, an alkali, preferably an alkali metal hydroxide solution, is included as acid-binding agent. The hydroxides and carbonates of lithium, sodium, potassium, and calcium or mixtures thereof are particularly well suited for the purpose.

In order to conserve space, it is preferable to employ as concentrated a solution of the aromatic dihydroxy compound as possible. When using such a concentrated solution, however, all of the acid-binding agents, such as sodium hydroxide solution, required for completing the polycarbonate-forming reaction should not be used for preparing the solution of the dihydroxy compound. Excess alkali over that required for dissolving the dihydroxy compound reduces its solubility. Thus the solubility problem is avoided by adding only a portion of the total requirements of alkali at one time. However, sufficient alkali should be present to maintain the reaction medium at a pH of at least 12, preferably between about 12 and 13.5. Therefore, in a preferred embodiment, the alkali solution is added in two or more separate steps or as a continuous stream while phosgene or bis-chlorocarbonic acid is simultaneously being added. In this way the alkali is continuously consumed and the solubility problem does not exist. According to this preferred embodiment of the invention, only about 70 percent of the total amount of alkali is used for dissolving the aromatic dihydroxy compound in water. The remaining amount of alkali solution is added, for instance, in 1, 2 or more steps while introducing phosgene or bis-chlorocarbonic acid ester and later the catalyst to the reaction mixture, for instance, 20 percent in the next step and 10 percent in the following.

Any suitable aromatic monohydroxy compound can be used as chain stopper, such as, for example, a phenol including hydroxy benzene, the cresols, p-isopropyl-phenols, p-tertiary-butyl-phenol, p-chlorophenol and the like. Any other aromatic monohydroxy compounds disclosed in the aforesaid patents and patent application, can be used. In general, amounts from about 0.1 to about 5 mol percent, related to the dihydroxy compounds, present in the reaction mixture, of such aromatic monohydroxy compounds may be used.

In the production of polycarbonates according to the present process, it is advantageous to employ small amounts of reducing agents, for example, sodium- or potassium- sulphide, -sulphite and -dithionite.

The polycarbonate can be separated from the reaction mixture by a continuous method in which the organic phase containing the polycarbonate is separated from the aqueous phase, such as, for example, by means of a liquid centrifuge. Preferably the organic phase after its separation from the water phase is washed with water or with a diluted alkali solution in order to remove any unreacted aromatic dihydroxy compound and then with diluted acid solution, for example, diluted hydrochloric acid, sulphuric acid, phosphoric acid and the like, and finally with water to completely remove all water soluble materials therefrom.

From the washed polycarbonate solution the solvent may be distilled off. In another embodiment of the invention the solution is heated to evaporate some of the solvent thereof, such as, for example, by distillation or by steam distillation. In this way, the solution of the polycarbonate is concentrated by partial removal of the solvent and the polycarbonate can be crystallized and then separated from the remaining solvent as described in the U.S. patent application Ser. No. 820,854, now U.S. Pat. 3,112,292. The remaining solvent may also be evaporated from the concentrated polycarbonate solution, for example, by heating the solution in a heated worm press and the solvent-free polycarbonate melt thus obtained may be extruded, for instance, to a bristle.

The polycarbonate may also be separated from its solvent by adding a suitable inert organic non-solvent for the polycarbonate, which is substantially miscible with the solvent. If sufficient non-solvent is added, the polycarbonate precipitates from the solution. By using a suitable amount of non-solvent it is possible to precipitate only the high molecular weight parts of the reaction product, while the low molecular weight parts remain in solution.

Precipitated polycarbonate may be separated from the liquid phase by any suitable means such as by filtering or centrifuging. The product is then dried, such as, for example, in an oven at 120° C. and 0.1 millimeter mercury pressure.

Another method of working up the diluted or concentrated polycarbonate solution consists in spraying it into an inert non-solvent liquid which is not miscible with the solvent of the solution, preferably into a hot liquid, for example, hot water. If the solvent of the solution has a lower boiling point than the non-solvent and the non-solvent has a temperature higher than the boiling point of the solvent, the solvent distills off and the polycarbonate precipitates in the non-solvent. For example, a solution of polycarbonate in methylene chloride may be sprayed into hot water of about 80–90° C. Methylene chloride instantaneously evaporates and the polycarbonate separates in a finely divided form in the water. It may be filtered off, the adhering water may be sucked off or squeezed off, and the only moist polycarbonate may be dried, melted and formed.

In addition to water, there may be mentioned, as suitable non-solvents which may be used as described above, for example, aromatic hydrocarbons, such as xylene, aliphatic and cycloaliphatic hydrocarbons, such as pentane, hexane, cyclohexane, methyl cyclohexane, and higher boiling hydrocarbons, alcohols, such as methanol, ethanol, propanol, butanol, isobutanol, ketones, such as acetone, methylethylketone, diethylketone, esters, such as acetic acid ethyl, propyl and butyl ester, glycol-mono-methyl-etherate, and some chlorides such as carbon tetrachloride.

Dyestuffs, pigments, stabilizers and other materials can be added to the solution of polycarbonate preferably after it has been washed with water to remove electrolytes and any other water soluble materials. By adding these materials at this time, a homogeneous dispersion of them in the polycarbonate is easily obtained.

The dried polycarbonate can be fabricated by thermoplastic methods, such as, for example, by injection molding, to form safety helmets, insulators for electrical devices, dentures and the like.

It has been found that a polycarbonate prepared in accordance with the process of this invention even with only an average total reaction time of from about 20 to about 240 minutes and preferably from about 30 to about 60 minutes has improved mechanical properties and discolors less than the heretofore available polycarbonates while being fabricated by thermoplastic methods. An especially remarkable advantages of the polycarbonates produced according to the invention there may be mentioned a surprisingly increased elongation and notch strength, even of products with relatively low molecular weights. While, for instance, a polycarbonate produced in a corresponding manner but batchwise as known in the art with a relative viscosity of 1.42 has a notch strength of about 7.6 cm. kg./cm.$^2$, the same polycarbonate, produced according to the present invention, but with a relative viscosity of 1.26 has a notch strength of 65.8 cm. kg./cm.$^2$. Furthermore, it is quite surprising that the new end products are essentially brighter than the products hitherto known. Thus, the light transmission, measured in the Hardy-Spectrograph, at, for instance, 400 and 700 millimicrons is 84 percent or 90 percent respectively, while this value of known products is about 58 percent.

What is claimed is:

1. A continuous process for preparing high molecular weight substantially linear polycarbonates having improved properties which comprises
   (1) continuously introducing a stream of (a) an aqueous alkaline solution of an aromatic dihydroxy compound and of a monohydric phenol as chain breaker containing from about 1.7 to about 2.3 mols of alkali hydroxide per mol of dihydroxy compound, and simultaneously (b) an inert organic solvent capable of dissolving the resulting polycarbonate, (c) at least an equivalent amount of phosgene or the bis-chlorocarbonic acid ester of an organic dihydroxy compound and, if the phenolate solution contains less than about 2.2 mols of alkali hydroxide per mol of dihydroxy compound, (d) a concentrated aqueous alkali hydroxide solution in such a ratio to maintain the pH value of the aqueous phase between about 12.0 and about 13.5,
   (2) progressively flowing the reaction mixture while introducing (e) a catalyst and simultaneously until the formation of the polycarbonate is completed (f) a further stream of a concentrated aqueous alkali hydroxide solution in such a ratio to maintain the pH value of the aqueous phase between about 12.0 and about 13.5 and
   (3) separating the organic phase from the aqueous phase and isolating the polycarbonate from the organic phase.

2. The process of claim 1 wherein the contact time ranges from about 20 to about 240 minutes.

3. The process of claim 1 wherein the mol ratio of aromatic hydroxy compound to phosgene is between aobut 1:1 and 1:1.4.

4. The process of claim 1 wherein the aromatic monohydroxy compound is present in an amount of from about 0.1 to about 5.0 mol percent based on the dihydroxy compounds.

5. The process of claim 1 wherein additional alkali hydroxide is added to the reaction mixture at at least two points during the course of the reaction.

6. The process of claim 1 wherein the catalyst and the remainder of the alkali hydroxide are introduced at separate points during the course of the reaction.

7. The process of claim 1 wherein the reaction is conducted at a temperature of from about 0° C. to about 100° C.

8. The process of claim 1 wherein the polycarbonate solution is continuously separated from the aqueous phase.

9. The process of claim 1 wherein the organic solvent is a mixture of organic solvents.

10. The process of claim 1 wherein the dihydroxy compound is a di-(monohydroxy-arylene)-alkane.

11. The process of claim 1 wherein the aromatic dihydroxy compound is 2,2-(4,4' - dihydroxy-diphenyl)-propane and the inert organic solvent is a mixture of methylene chloride and chlorobenzene.

References Cited
UNITED STATES PATENTS

| | | | |
|---|---|---|---|
| 3,062,781 | 11/1962 | Bottenbruch et al. | 260—47 |
| 3,133,044 | 5/1964 | Allen et al. | 260—47 |
| 3,275,601 | 9/1966 | Schnell et al. | 260—47 |

SAMUEL H. BLECH, Primary Examiner

U.S. Cl. X.R.

260—49